United States Patent
Völkel et al.

(10) Patent No.: US 7,976,749 B2
(45) Date of Patent: Jul. 12, 2011

(54) INJECTION PROCESS FOR MAKING A MOULDING COMPLETELY RECYCLABLE, MULTILAYERED ARTICLE

(75) Inventors: Mark Völkel, Ladenburg (DE); Carsten Weiß, Singapore (SG); Andreas Eipper, Ludwigshafen (DE); Christophe Ginss, Wolxheim (FR); Gianluca Pizzati, Senna Comasco (IT); Vittorio Bortolon, Padua (IT)

(73) Assignees: BASF Aktiengesellschaft (DE); P Group S.R.L. (IT)

( * ) Notice: Subject to any disclaimer, the term of this patent is extended or adjusted under 35 U.S.C. 154(b) by 522 days.

(21) Appl. No.: 11/753,324

(22) Filed: May 24, 2007

(65) Prior Publication Data
US 2008/0292864 A1 Nov. 27, 2008

(51) Int. Cl.
*B32B 37/00* (2006.01)
(52) U.S. Cl. .............. 264/45.6; 264/45.2; 264/45.4; 264/45.5
(58) Field of Classification Search ........ 264/45.2, 264/45.4, 45.5, 46.6
See application file for complete search history.

(56) References Cited

U.S. PATENT DOCUMENTS

| 4,321,341 | A | * | 3/1982 | Neuberg et al. | 525/437 |
| 2001/0029137 | A1 | | 10/2001 | Popp | |
| 2003/0001411 | A1 | * | 1/2003 | Gedritis et al. | 296/192 |
| 2003/0162001 | A1 | * | 8/2003 | Rosch et al. | 428/192 |
| 2004/0018337 | A1 | * | 1/2004 | Hus et al. | 428/91 |
| 2005/0064141 | A1 | * | 3/2005 | Flaig et al. | 428/141 |
| 2005/0183897 | A1 | * | 8/2005 | DePue | 180/90 |

FOREIGN PATENT DOCUMENTS

| DE | 10003595 A1 | 8/2001 |
| WO | WO-96/33060 | 10/1996 |
| WO | WO-97/48537 | 12/1997 |

* cited by examiner

Primary Examiner — Joseph S Del Sol
Assistant Examiner — David N Brown, II
(74) Attorney, Agent, or Firm — Connolly Bove Lodge & Hutz LLP

(57) ABSTRACT

An injection moulding process for making a completely recyclable, multilayered article which contains:
  i) a rigid layer formed of a thermoplastic polymer and
  ii) a foamed skin layer formed of a thermoplastic polymer compatible with the material of the rigid layer, by
    injection moulding of the rigid layer into a mould composed of two sides,
    lifting one side of the mould, or change one side of the mould to obtain a small gap of between 3 to 4 mm between the rigid layer and the side of the mould lifted or changed and
    injecting the foamed skin layer into the gap formed in step b).

11 Claims, No Drawings

INJECTION PROCESS FOR MAKING A MOULDING COMPLETELY RECYCLABLE, MULTILAYERED ARTICLE

DESCRIPTION OF THE PRIOR ART

With reference to the automotive industry, two main typologies of panels and relating processing techniques have been used for car interiors:

i) rigid interior panels, realized using injection technique, commonly made in PP modify or reinforced, PC/ABS, PA/ABS, or other thermoplastic material; this solution has been used in lower segment of car market due to some aesthetical and haptic limits, and, ii) soft interior panels that are realized commonly assembling three different layers:
   - a rigid layer (structure), usually realized using injection moulding technique, and made of material and/or blends like polypropylene with glass fibers (PP GF) or with mineral charge, ABS GF, PC/ABS, PPE/HIPS, SMA etc.,
   - a foamed layer, usually made in polyurethane (PU-foam), and
   - a skin layer realized by means of techniques like "slush moulding", calandering, etc., using materials like PVC, TPU.

In the state of the art the material most widely used for the skin layer in dashboard and interior panel application, is PVC (slush-skin). However PVC is not compatible with other thermoplastic polymers and, in any case, the presence of PU-foam imparting the necessary soft touch, causes the material to be separated apart before its recovering and recycling, at the end of its life.

As it is well-known, for example, from the German patent DE-A-10003595 or from the patent applications WO 96/33060 and WO 97/48537, self structure articles superficially finished as a dashboard for cars are prepared in many stages; usually at first stage preparing a rigid structure with a traditional thermoplastic polymer using injection moulding technology.

Subsequently the article is pulled out from the mould and finished and superficially ennobled, in one or more stages, through the cover with a layer of foamy material quite thin and, so, with leathers or synthetic covers prepared apart using different techniques and materials. For example, the leather, eventually combined to a foamy layer, can be prepared with the "slush moulding" technique.

Focusing on soft interior panels or similar applications made with these above mentioned prior techniques some limits bring about. In particular, parts produced before the present invention needed three different steps in the manufacturing process; this means more investment to equipment and more space for their operating, more energy consumption, more time for assembling, additional logistical administration and room in the warehouse to stock the parts before assembling.

Moreover, using the above mentioned prior art solutions, the panel and the other interior parts, made using different process techniques and in addition made of different materials, cannot easily be recycled. All layers of different polymer compositions, constituting the composite material, had to be carefully separated before recycling. Otherwise, the mechanical properties of the recycled polymer (like impact strength or elongation at break) would have been poor and insufficient even for lowest applications. For these reasons, the recycling of the above composite materials was costly, complex and time-consuming.

DESCRIPTION OF THE INVENTION

Multilayered moulded articles made from polymeric materials in particular for use in the interior of motor vehicles have to meet high requirements, particularly for their mechanical properties, surface properties, aging performance and also odour performance. Various polymeric materials are currently used to produce mouldings for interior applications in motor vehicles.

Furthermore, the moulding compositions should have a very low density. The low density material is advantageous either for saving fuel and obtaining the desired soft touch. The moulding compositions should, in addition, have very low emission of volatile constituents, so that the novel moulding compositions have an acceptable odour performance. The rigid layer should finally give good adhesion to foams.

It was an object of the invention to give a process of injection moulding for making multilayered moulded articles which have a completely recyclable structure, and the articles obtained starting from the recycled material having sufficient good mechanical properties like elongation at break and impact strength.

This object is solved by an injection moulding process for making a completely recyclable, multilayered article consisting of:

i) a rigid layer formed of a thermoplastic polymer and ii) a foamed skin layer formed of a thermoplastic polymer compatible with the material of the rigid layer, by a) injection moulding of the rigid layer into a mould composed of two sides, b) lifting one side of the mould, or change one side of the mould to obtain a small gap of between 3 to 4 mm between the rigid layer and the side of the mould lifted or changed and c) injecting the foamed skin layer into the gap formed in stop b).

In an embodiment this object is solved by an injection moulding process for making a completely recyclable, multilayered article consisting of:

i) a rigid layer formed of a thermoplastic polymer and ii) a foamed skin layer formed of a thermoplastic polymer compatible with the material of the rigid layer, by d) injection moulding of the rigid layer into a mould composed of two sides, e) lifting one side of the mould, or change one side of the mould to obtain a small gap of between 3 to 4 mm between the rigid layer and the side of the mould lifted or changed and f) injecting the foamed skin layer into the gap formed in step b) wherein both the thermoplastic polymer forming the rigid layer and the thermoplastic materials forming the foamed skin layer comprise polyethylene terephthalate In the present patent application compatibility between the materials used for producing the rigid layer and the foamed skin layer means that the elongation at break of the complete article, comprising the rigid layer and the foamed skin layer is not less than 80% of the elongation at break of the rigid layer alone.

Description of the Process Techniques

The injection moulding process might be preferably performed according to the following process techniques:

The first preferred process technique is over moulding, which comprises the following process sequences (involving decompression technique like option):
a) injection moulding of the rigid layer, made in thermoplastic material, optionally with solved gas or chemical foaming agent, and b) lifting one side of the mould, or change one side to obtain a small gap, preferred from to 2 mm to 4 mm, between the rigid layer and the mould, and
c) optionally, inserting an in mould decoration (IMD) skin layer film comprising a thermoplastic polymer, compatible with the materials used both for the rigid layer and foamed layer, in order to improve surface properties,
d) injection moulding of the thermoplastic elastomeric material, compatible with the one used as first layer together with a physical or chemical foaming agent to form the foamed skin layer and,
e) optionally repeating step b) and enlarging the gap from 10% to 400% of the previous space, till attaining the required foam density (decompression moulding of the foamed layer),
f) optionally, over painting the foamed skin layer, after the injection process or using IMP (in mould painting) to realize a solid top layer of excellent surface quality and characteristics.

In the overmoulding process the foamed skin layer is formed of one single type of thermoplastic elastomeric material.

In the step of in mould decoration (IMD), which is optional, a skin layer film is inserted in the mould, in order to improve surface properties.

In the step of in mould painting (IMP), which also is optional, a paint is sprayed on the mould surface and afterwards a material which forms the formed layer is injected. At the end of the process, the paint remains on the surface of the article. The paint can be coloured, but it is not necessary. Usually, in dashboard applications a clear, protective layer is enough.

The second process technique, disclosed in the present invention, is co-injection moulding. With this technique better final results in term of surface quality are achievable. The main benefit is the core being completely insulated from the skin; this implies that any gas presence onto the surface is avoided.

Furthermore, co-injection allows the core to be purely structural, permitting to obtain a low density, not aesthetic and less expensive foamed layer part, while the skin part provides the other functions and higher surface properties.

It is also possible to use co-injection and decompression technique together in the same process to improve surface quality if required.

In the co-injection process the foamed skin layer is formed of two different materials, one denominated S for the skin layer part and the second one denominated F for the foamed layer part.

The material S is preferable a thermoplastic elastomer, compatible with the material used for the foamed layer part and also compatible with the material used for the layer; material F is a thermoplastic foamed material compatible with the material used for skin layer part, physically or chemically foamed.

The process for producing a co-injected structure comprises the following steps:
a) injection moulding of the rigid layer, optionally with solved gas or chemical foaming agent
b) lifting one side of the mould, or change one cavity to obtain a small gap, preferred from to 2 mm to 12 mm, between the rigid layer and the mould, and
c) optionally, inserting an in mould decoration (IMD) skin layer film comprising a thermoplastic polymer, compatible with the materials used both for the rigid layer and foamed layer, in order to improve surface properties,
d) co-injection phase starts with injecting the skin layer part of thermoplastic material compatible with the material used for rigid layer, which fills the cavity partially, subsequently, the foamed layer part (core material) is injected, penetrating the initial skin layer part. The two materials do not mix and the core does not puncture the skin due to laminar flow. The foamed layer part is also thermoplastic material, optionally foamed by means of solved gas or chemical foaming agent;
preferable, to ensure complete encapsulation of the core material, the skin material is injected another time to finish the part,
e) optionally repeating step b) enlarging the gap from 10% to 400% of the previous space, till attaining the required foam density (decompression moulding of the foamed layer and
f) optionally, over painting the skin layer, after the injection process or using IMP (in mould painting Technologies) to realize a solid top layer of excellent surface quality and characteristics.

Different foaming techniques and additives are used in the plastic market in order to achieve low density, good aesthetic quality on the skin surface and best foamed structure of the foamed skin layer.

As well known, current foaming technologies imply some evident limits, the major one being the large and not uniform size of the cells. These drawbacks can cause a fall both in mechanical (e.g., impact strength, brittleness, and fatigue resistance) and aesthetical properties, due to the difficulty in controlling of the gas concentration and release inside the melt.

Homogeneous nucleation is necessary to solve the above mentioned problems, involving big amount of blowing agent or solved gas, high temperature and high pressure to create a single-phase solution.

Two main foaming technologies are employed with thermoplastic polymers:
i) physical foaming
using usually atmospheric gases, such as carbon dioxide ($CO_2$) or nitrogen ($N_2$) directly mixed with the material inside the injection screw and
ii) chemical foaming
usually obtaining foam by the blowing agent (CBA) decomposition during the process. Such chemical decomposition may be either endothermic or exothermic. Endothermic foaming agents primarily produce CO2 while exothermic ones mostly generate N2. There are several chemical blowing agents (CBA), both organic and inorganic like: azodicarbonamide (ADC); 4,4-oxybis benzene sulfonyl hydrazide (OBSH); p-toluene sulfonyl hydrazide (TSH); 5-phenyltetrazole (5-PT); p-toluene sulfonyl semicarbazide (PTSS); dinitroso pentamethylene tetramine (DNPT); sodium bicarbonate (SBC); zinc carbonate (ZnCO3); etc.

The goal of the present invention is to achieve excellent soft touch feeling, aesthetics, low density (from 0.2 to 0.8 g/cm) and good foam structure in terms of bubble's size uniformity.

Another crucial target is to maintain the lowest volatiles emission (with reference to last requirements in automotive sector).

Considering these requests most organic blowing agents are not suggested due to environmental concerns.

The choice of the preferred foaming technology, regarding the present invention, depends upon the desired thickness for the part; e.g. with large gap, approximately more than 100% (using decompression moulding of the foamed layer) physical foaming is preferred.

Despite several different solutions were tested, obtaining acceptable results, both the two preferred embodiments use physical foaming technology; the second one together with chemical blowing agent inside the polymer.

Preferred solutions are:
a) Physically foaming the part, controlling pressure level used to mix gas and material in a homogeneous phase. Most important factors, during the process, were demonstrated to be very high pressure level; the preferred conditions being over 350 bar of mixing pressure, high contents (from 0.1% to 2% in volume) of atmospheric gases, such as carbon dioxide ($CO_2$) or nitrogen ($N_2$). The material temperature in the barrel is in function of the polymer used, usually from 170° and 280° C. In order to achieve the required aesthetics and the right foam structure, a fine tuning and monitoring of mould opening rates during decompression, after foamed layer injection, is needed.
b) Together Physical and Chemical foaming the part, mixing blowing agent in different percentage. This technique increases surface aspect maintaining good foam structure. The chemical blowing agent increases the nucleation rates within the foaming material. The operating conditions still remain the same as described under a).

The plastic material is mixed with the chemical blowing agent before the process. Preferred agent is Sodium Carbonate based additives (or other inorganic blowing agents), in the amounts from 0.1% to 3% weight percentage.

The parts obtained with the above mentioned solutions exhibit evenly distributed and uniformly sized microscopic cells (generally between 20-100 microns in size, depending on the material and process condition). Foamed materials produced with the above described conditions offer improved consistency and more homogeneity of cell structures, compared to other foaming systems and demonstrate lower VOCs emission.

Other approaches like polymer microsphere shells encapsulating gas, that when heated, increases its pressure and volume, were tested but poor results were achieved in term of density reduction and narrow process windows, due to their short residence time.

In some cases, special characteristics of the skin layer, like different colour finishing, scratch resistance, etc. are required for the present invention.

Some of these requirements can be achieved by inserting an in mould Decoration (IMD) skin film layer of a thermoplastic polymer compatible with the rigid and the foamed skin layer.

This layer, which owing to its thin thickness is comparable to a film, is realizable by means of different techniques like extrusion and/or film blowing, the last one being preferred due to cost saving.

Usually, any pro processing of the layer film like performing is avoided, because of the transforming technique, material flexibility and compatibility to the other layers.

In several cases when the parts' geometry requires very low radius or sharp corners it is possible to preheat some areas of the film to increase its forming property or working directly with a preformed layer film.

To preserve recycling of the article the layer film must be compatible with the material of both the rigid and the foamed skin layer permitting also to realize a chemical bond between the in mould decoration skin layer film and the foamed skin layer without any adhesive or post treatment.

This IMD layer film, as said previously, is achievable by way of different techniques but using compatible materials, preferred solution consisting in materials of the same family as the foamed skin layer, but with other characteristics like hardness, colour, UV stabilization, etc.

Regarding the process, the layer film is inserted in the mould, on the leather grained surface side, before to inject the foamed layer.

The layers' thickness is variable in function of the leather grained depth, material family and with reference to the parts' geometry, especially referring to the fillet and angle.

In order to reduce costs and realize a one shot process the film is made without any surface finishing to allow injected melts' heat and pressure to form a flat film into the required geometry and copying the surface treatment.

Critical process parameters include: material filling rates adjustment, for proper film stretching, and mould temperature control.

Other focal points concerning tooling are gate type and location, ejection from the core side, and proper venting to remove air between the film and substrate.

In the following there is given a short description of the process:
i) positioning of the IMD layer film, with a roll or with a robot on the mould (pre cut flat-film inserts being also usable)
ii) optionally, applying vacuum or inside pressure to the cavity to maintain the layer film in contact with the mould face and
iii) injecting from behind the foaming layer into the mould to bind the rigid layer and IMD layer film, and to permit the surface treatment copy from the layer film.

When the IMD layer film is not preformed after moulding, excess thereof is typically trimmed, folded, and wrapped around the parting lines.

The above mentioned solution is a environmentally more friendly process than painting and in mould painting technique, also guaranteeing skin characteristics requirements, more flexibilities in terms of surface appearance and cost saving.

Materials

A variety of thermoplastic materials are suitable for using in the injection techniques disclosed in the present invention. Below are listed some appropriate polymers for the rigid layer, for the foamed skin layer and the IMD layer film.

Preferably,
i) the rigid layer is formed of a PP, PBT, SMA, SAN, ABS; an ABS/AMSAN-, ABS/PC-, ABS/PA-, PBT/PET-, PBT/ASA or PPE/HIPS-blend and
ii) the foamed skin layer is formed ob TPC/PBT, TPO, TPU or PVC.

Further preferably,
i) the rigid layer is formed of a fiber reinforced PBT/ASA blend, and
ii) the foamed skin layer is formed of TPO/PBT or TPU.

Still further preferably,
i) the rigid layer is formed of a fiber reinforced PP, and
ii) the foamed skin layer is formed of TPC/PBT or TPU.

Particularly preferably,
i) the rigid layer is formed of a fiber reinforced ABS/PA blend, and
ii) the foamed skin layer is formed of TPC/PBT or TPU.

In a preferred embodiment:
i) the rigid layer is made of: PP, SMA (styrene maleic anhydride), SAN (styrene acrylnitrile), ABS; PPE(polyphenylenether)HIPS-, ABS/AMSAN(alpha-methyl-SAN)-, ABS/PC(polycarbonate)-, or ABS/PA (polyamide)-, PBT/ASA, or PBT/PET blend, particularly PBT/ASA with a glass, carbon or thermoplastic fibre content from 0 to 30% in weight;

particularly ABS/PA with a glass, carbon or thermoplastic fibre content from 0 to 30% in weight;
particularly SAN with a glass fibre content from 10 to 50% in weight and comprising long glass fibre;
particularly PP with a glass fibre content from 10 to 50% in weight and comprising long glass fibre. Furthermore 10 to 40% in weight of the following fillers are used: calcium stearate, talc, wollastonit; and ii) the foamed skin layer is made from a material selected from the group consisting of TPC/PBT (as defined in PF 57804, page 16, line 20ff), TPO (thermoplastic polyolefine), TPU (thermoplastic polyurethane) or PVC, particularly TPC/PBT or TPU.

Most preferred embodiments are indicated in the table below:

| Rigid Layer | | |
| --- | --- | --- |
| | Fiber reinforced | Foamed layer |
| PP | yes | TPC/PBT |
| PP | yes | TPU |
| SAN | yes | TPC/PBT |
| SAN | yes | TPU |
| PBT/ASA | yes | TPC/PBT |
| PBT/ASA | no | TPC/PBT |
| PBT/ASA | Yes | TPU |
| PBT/ASA | no | TPU |
| ABS/PA | yes | TPC/PBT |
| ABS/PA | no | TPC/PBT |
| ABS/PA | yes | TPU |
| ABS/PA | no | TPU |

Rigid Layer:

The rigid layer preferably comprises polybutylene terephthalate (PBT) as component A1, from 45 to 100% by weight, further preferably from 55 to 90% by weight, and particularly preferably from 80 to 90% by weight. Besides PBT further aromatic polyesters can be used as component A2.

Further aromatic polyesters are preferably prepared by reacting terephthalic acid, its esters or other ester-forming derivatives with 1,4-butanediol, 1,3-propanediol or, respectively, 1,2-ethanediol in a manner known per se. Up to 20 mol % of the terephthalic acid may be replaced by other dicarboxylic acids. Mention may be made here, merely as examples, of naphthalene dicarboxylic acids, isophthalic acid, adipic acid, azelaic acid, sebacic acid, dodecanedioic acid and cyclohexanedicarboxylic acids, mixtures of these carboxylic acids and ester-forming derivatives of the same. Up to 20 mol % of the dihydroxy compounds 1,4-butanediol, 1,3-propanediol and respectively, 1,2-ethanediol may also be replaced by other dihydroxy compounds, e.g. 1,6-hexanediol, 1,4-hexanediol, 1,4-cyclohexanediol, 1,4-di(hydroxy-methyl)cyclohexane, bisphenol A, neopentyl glycol, mixtures of these diols or else ester-forming derivatives of the same.

Further aromatic polyesters, for example, are polytrimethylene terephthalate (PTT) and in particular polyethylene terephthalate (PET), formed exclusively from terephthalic acid, propanediol and 1,4-butanediol. Some or all of the aromatic materials may be in form of recycled polyester materials regrind from e.g. bottle material or bottle production waste. In particular PBT or PBT/PET blends are made of recycled polyester and the vehicle form parts can be easily recycled themselves.

In a particularly preferred embodiment component A is composed of
from 70 to 100% by weight, preferably from 80 to 100%, particularly preferably from 90 to 100% by weight of PBT, and
from 0 to 30% by weight, preferably from 0 to 20%, particularly preferably from 0 to 10% by weight of PET. Preference is moreover given to moulding compositions in which component A is PET-free.

The novel moulding composition comprises, as component B, from 0 to 25% by weight, preferably from 3 to 20% by weight, particularly preferably from 10 to 15% by weight, of at least one particulate graft copolymer whose soft phase has a glass transition temperature below 0° C., and whose median particle size is from 50 to 1000 nm.

Component B is preferably a graft copolymer made from
from 50 to 90% by weight of a particulate graft base B1 with a glass transition temperature below 0° C., and
from 10 to 50% by weight of a graft B2 made from the following monomers
b21) as component B21, from 50 to 90% by weight of a vinylaromatic monomer, and
b22) as component B22, from 10 to 50% by weight of acrylonitrile and/or methacrylonitrile.

The particulate graft base B1 may be composed of from 70 to 100% by weight of a $C_1$-$C_{10}$-alkyl acrylate, and of from 0 to 30% by weight of a bifunctional monomer having two non-conjugated olefinic double bonds.

In a preferred embodiment of the invention the graft base B1 is composed of the following monomers:
as component B11, from 75 to 99.9% by weight of a $C_1$-$C_{10}$-alkyl acrylate,
as component B12, from 0.1 to 10% by weight of at least one polyfunctional monomer having at least two non-conjugated olefinic double bonds, and
as component B13, from 0 to 24.9% by weight of one or more other copolymerizable monomers.

The graft base B1 is an elastomer whose glass transition temperature is preferably below −20° C., particularly preferably below −30° C.

The main monomers B11 used to prepare the elastomer are acrylates having from 1 to 10 carbon atoms, in particular from 4 to 8 carbon atoms, in the alcohol component. Particularly preferred monomers B11 are isobutyl and n-butyl acrylate, and also 2-ethylhexyl acrylate, particularly preferably butyl acrylate.

Besides the acrylates, the crosslinking monomer B12 used is from 0.1 to 10% by weight, preferably from 0.1 to 5% by weight, particularly preferably from 1 to 4% by weight, of a polyfunctional monomer having at least two non-conjugated olefinic double bonds. Examples of these are divinylbenzene, diallyl fumarate, diallyl phthalate, trially cyanurate, triallyl isocyanurate, tricyclodecenyl acrylate and dihydrodicyclopentadienyl acrylate, particularly preferable the latter two.

Besides the monomers B11 and B12, the structure of the graft base B1 bay also involve up to 24.9% by weight, preferably up to 20% by weight, of other copolymerizable monomers, preferably 1,3-butadiene, styrene, α-methylstyrene, acrylonitrile, methacrylonitrile and $C_1$-$C_8$-alkyl methacrylates, or mixtures of these monomers. In a particularly preferred embodiment no 1,3-butadiene is present in the graft base B1, and the graft base B1 in particular is composed exclusively of components B11 and B12.

Grafted onto the graft base B1 there is a graft B2 made from the following monomers:
as component B21, from 50 to 90% by weight, preferably from 60 to 90% by weight, particularly preferable from 65 to 80% by weight, of a vinylaromatic monomer, and
as component B212 from 10 to 50% by weight, preferably from 10 to 40% by weight, particularly preferable from 20 to 35% by weight, of acrylonitrile or methacrylonitrile or mixtures of these.

Examples of vinylaromatic monomers are unsubstituted styrene and substituted styrenes, such as α-methylstyrene, p-chlorostyrene and p-chloro-α-methylstyrene. Preference is given to unsubstituted styrene and α-methylstyrene, particularly unsubstituted styrene.

In one embodiment of the invention the median particle size of component B is from 50 to 200 nm, preferably from 55 to 150 nm.

In another embodiment of the invention the median particle size of component B is from 200 to 1000 nm, preferably from 400 from 550 nm.

In another preferred embodiment of the invention component B has a bimodal particle size distribution and is composed of from 10 to 90% by weight, preferably from 30 to 90% by weight, particularly preferably from 50 to 75% by weight, of a fine-particle graft copolymer with a median particle size of from 50 to 200 nm, preferable from 55 to 150 nm, and from 10 to 90% by weight, preferably from 10 to 70% by weight, particularly preferably from 25 to 50% by weight, of a coarse-particle graft copolymer with a median particle size of from 250 to 1000 nm, preferable from about 400 to 550 nm.

The median particle size and particle size distribution given are the sizes determined from the integral mass distribution. The median particle sizes according to the invention are in all cases the ponderal median of the particle sizes. The determination of these is based on the method of W. Scholtan and H. Lange, Kolloid-Z. and Z.-Polymere 250 (1972), pages 782-796, using an analytical ultracentrifuge. The ultracentrifuge measurement gives the integral mass distribution of the particle diameter in a specimen. Prom this it is possible to deduce what percentage by weight of the particles has a diameter identical to or smaller than a particular size. The median particle diameter, which is also termed the $d_{50}$ of the integral mass distribution, is defined there as the particles diameter at which 50% by weight of the particles have a diameter smaller than the corresponding to the $d_{50}$. To describe the breadth of the particle size distribution of the rubber particles, the $d_{10}$ and $d_{90}$ given by the integral mass distribution are utilized alongside the $d_{50}$ (median particle diameter). The $d_{10}$ and $d_{90}$ of the integral mass distribution are defined similarly to the $d_{50}$ with the difference that they are based on, respectively, 10 and 90% by weight of the particles. The quotient $$(d_{90}-d_{10})/d_{50}=Q$$

is a measure of the breadth of the particle size distribution. Emulsion polymers A which can be used according to the invention as component A preferably have Q less than 0.5, in particular less than 0.35.

The graft copolymer B generally has one or more stages, i.e. It is a polymer composed of a core and of one or more shells. The polymer is composed of a base (graft core) B1 and of, grafted onto this, one, or preferably more than one, stages B2 (graft), known as grafts or graft shells.

By grafting one or more times it is possible to apply one or more graft shells to the rubber particles. Each graft shelf may have a different makeup. In addition to the grafting monomers and together with these, polyfunctional crosslinking monomers or monomers containing reactive groups may be grafted on (see, for example, EP-A 0 230 282, DE-A 36 01 419, EP-A 0 269 861).

In one embodiment of the invention crosslinked acrylate polymers with a glass transition temperature below 0° C. serve as graft base B1. The crosslinked acrylate polymers should preferably have a glass transition temperature below −20° C., in particular below −30° C.

In principle the structure of the graft copolymer may also have two or more layers, where at least one inner layer should have a glass transition temperature below 0° C. and the outermost layer should have a glass transition temperature above 23° C.

In a preferred embodiment the graft B2 is composed of at least one graft shell. The outermost graft shell of these has a glass transition temperature above 30° C. A polymer formed from the monomers of the graft B2 would have a glass transition temperature above 80° C.

Suitable preparation processes for graft copolymers B are emulsion, solution, bulk and suspension polymerisation. The graft copolymers B are preferably prepared by free-radical emulsion polymerization, at temperatures of from 20 to 90° C. using water-soluble and/or oil-soluble initiators, such as peroxodisulfate or benzoyl peroxide, or with the aid of redox initiators. Redox initiators are also suitable for polymerisation below 20° C.

Suitable emulsion polymerisation processes are described in DE-A-28 26 925, DE-A-31 4 358 and in DE-C-12 60 135.

The graft shells are preferably built up in the emulsion polymerization process as described in DE-A-32 27 555, 31 49 357, 31 49 358 and 34 14 118. The specified setting of the particle sizes according to the invention at from 50 to 1000 nm preferable takes place by the methods described in DE-C-12 60 135 and DE-A 28 26 925, or in Applied Polymer Science, Vol. 9 (1965), page 2929. The use of polymers with different particle sizes is known, for example, from DE-A 28 26 925 and U.S. Pat. No. 5,196,480.

The novel moulding compositions comprise, as component I, from 0.1 to 10% by weight of conventional additives. Examples of additives of this type are: UV stabilizers, transesterification stabilizers, oxidation retarders, lubricants, mould-release agents, dyes, pigments, colorants, nucleating agents, antistats, antioxidants, stabilizers to improve thermal stability, to increase light stability, to raise hydrolysis resistance and chemicals resistance, agents to prevent decomposition by heat, and in particular the lubricants useful for producing mouldings. These other additives may be metered in at any stage of the preparation process, but preferably at an early juncture so as to make use at an early stage of the stabilizing effects (or other specific effects) of the additive. Heat stabilizers or oxidation retarders are usually metal halides (chlorides, bromides or iodides) derived from metals in Group I of the Periodic Table of the Elements (for example Li, Na, K or Cu).

Suitable stabilizers are the usual sterically hindered phenols, or else vitamin E or compounds of similar structure. HALS stabilizers (hindered amine light stabilizers) are also suitable, as are benzophenones, resorcinols, salicylates, benzotriazoles and other compounds (for example Irganox®, Tinuvin®, such as Tinuvin® 770 (HALS absorbers, bis (2,2, 6,6-tetramethyl-4-piperidyl)sebacate) or Tinuvin® P (UV absorber-(2H-benzotriazol-2-yl)-4-methylphenol) or Topanol®). The amounts of these usually used are up to 2% by weight, based on the entire mixture.

Examples of suitable transesterification stabilizers are organic phosphonites, such as tetrakis(2,4-di-ter-butylphenyl) bisphenylenediphosphonite (Irgaphos® PEPQ from Ciba Geigy AG) and also monozic phosphate (mono- or dihydrate). The transesterification stabilizers may, for example, be used in powder form or as PBT masterbatches.

Suitable lubricants and mould-release agents are stearic acids, stearyl alcohol, stearates and generally higher fatty acids, derivatives of these and corresponding fatty acid mixtures having from 12 to 30 carbon atoms. The amounts of these additives are from 0.05 to 1% by weight.

Other possible additives are silicone oils, oligomeric isobutylene and similar substances. The amounts are usually from 0.06 to 5% by weight. Use may likewise be made of pigments, dyes, optical brighteners, such as ultramarine blue, phthalocyarlines, titanium dioxide, cadmium sulfides or derivatives of perylenetetracarboxylic acid.

Processing aids and stabilizers, such as UV stabilizers, lubricants and antistats are generally used in amounts of from 0.01 to 5% by weight, based on the entire moulding composition.

It is also possible to use amounts of, for example, up to 5% by weight, based on the entire moulding composition, of nucleating agents, such as talc, calcium fluoride, sodium phenylphosphinate, alumina or fine-particle polytetrafluoroethylene. Amounts of up to 5% by weight, based on the moulding composition, of plasticizers, such as dioctyl phthalate, dibenzylphthalate, butyl benzyl phthalate, hydrocarbon oils, N-(n-butyl)benzenesulfonamide, or o- or p-tolueneethylsulfonamide are advantageously added. It is also possible to add amounts of up to 5% by weight, based on the moulding composition, of colorants, such as dyes or pigments.

The rigid layer has preferably a layer thickness of 1 to 10 mm, particularly preferred comprising 1 to 4 mm.

Foamed Skin Layer and in Mould Decoration Layer Film

The foamed skin layer and the in mould decoration layer film material usable in the process according to the present invention comprise a thermoplastic polyester elastomer (TPC) containing polybutylene terephthalate (PBT).

The thermoplastic polyester elastomer (TPC) refers to a segmented copolyester containing hard polyester segments and soft segments of a flexible polymer or oligomer that is substantially amorphous, with a glass-transition temperature (Tg) of below 0° C. In the case soft segments are polyethers the copolyester is also referred to as Copolyether ester (TPC-ET); in the case soft segments are polyesters the copolyester is referred to as Copolyester ester (TPC-ES); in the case soft segments contain ester and ether linkages the copolyester is referred to as TPC-EE.

Such segmented copolyester is understood to having a multiplicity of repeating long-chain ester units (soft segments) and short-chain ester units (hard segments) connected to each other in head-to-tail fashion through linkages of the ester type.

Said short-chain units may be represented by the general formula (I):

—O-D-O—CO—R—CO (I)

said long-chain ester units may have the general formulas (IIa) and/or (IIb):

—O-G-O—CO—R—CO (IIa)

—O-D-O—CO-A-CO— (IIb)

wherein:

D is a divalent radical remaining after the removal of the hydroxyl groups from an alkylene glycol having a molecular weight lower than about 250;

R is a divalent radical remaining after the removal of the carboxyl groups from a dicarboxylic acid having a molecular weight lower than about 300;

G is a divalent radical remaining after the removal of the hydroxyl end groups from a long chain glycol having a molecular weight of from about 250 to about 6,000

A is a divalent radical remaining after the removal of the carboxyl groups from an unsaturated or saturated long chain dicarboxylic acid and O is oxygen.

The expression "short-chain ester units", in connection with units present in a polymeric chain, relates to the reaction product of a diol (D) having a low molecular weight (lower than about 250) and a dicarboxylic acid under formation of ester units represented by formula (I) above. Among the diols having a low molecular weight which may be reacted in order to form short-chain ester segments are non-cyclic, alicyclic and aromatic di-hydroxy compounds. Diols of from 2 to 15 carbon atoms, such as ethylene-glycol, propylene-glycol, isobutylene-glycol, tetramethylene-glycol, pentamethylene-glycol, 2,2-dimethyltrimethylene-glycol, hexamethylene-glycol, decamethylene glycol, di-hydroxy-cyclohexane, cyclohexane-dimethanol, resorcinol, hydroquinone, 1,5-di-hydroxy-naphthalene, etc., are preferred. Particularly preferred are aliphatic diols containing from 2 to 8 carbon atoms. Aromatic di-hydroxy compounds which ran also be used are bisphenols, such as bis-(p-hydroxy)-diphenyl, bis-(p-hydroxyphenyl)-methane and bis-(p-hydroxyphenyl)-propane. Equivalent ester-forming derivatives of diols can be used as well (for example, ethylene oxide or ethylene carbonate can be used instead of ethylene glycol). The expression "low-molecular-weight diols" used in the present context should thus be understood as including all of the derivatives suitable for forming esters. However, the condition with respect to molecular weight only applies to the diol, but not to the derivatives thereof. 1,4-Butane-diol must be at least a part of the diols used.

Dicarboxylic acids (R) which may be reacted with the low molecular weight diols and the long-chain glycols in order to produce the copolyesters according to the present invention are aliphatic, cycloaliphatic or aromatic dicarboxylic acids having a low molecular weight, i.e., having a molecular weight of less than about 300. The term "dicarboxylic acids" as used herein also encompasses equivalent derivatives of dicarboxylic acids which show behaviour substantially similar to the dicarboxylic acids in the reaction with glycols and diols for the formation of the copolyester polymers. These equivalent compounds include esters and ester-forming derivatives, such as, e.g., halides and anhydrides. However, the condition with respect to molecular weight always relates to the acid, and not to its ester equivalent or to its derivative suitable for forming esters. Accordingly, the term "dicarboxylic acid" also comprises an ester of a dicarboxylic acid having a molecular weight higher than about 300, or an equivalent of a dicarboxylic acid having a molecular weight higher than about 300, provided that the corresponding acid still has a molecular weight of less than about 300. The dicarboxylic acids may contain any substituent or any combination of substituents which do not interfere to a significant extent with the formation of the copolyester polymer and the use of the polymer in the end products according to the present invention. Within the context of the present invention, by "aliphatic dicarboxylic acids" those carboxylic acids are meant which contain two carboxylic groups, each of said carboxyl groups being bonded to a saturated carbon atom. If the carbon atom to which the carboxyl group is bonded is a saturated one and is inside a ring, the acid is a cycloaliphatic one. The term "aromatic dicarboxylic acids", used in the instant context, indicates those dicarboxylic acids which contain two carboxyl groups, It is not necessary that both functional carboxyl groups be attached to the same aromatic ring and where more than one ring is present they can be joined by aliphatic or aromatic divalent radicals or divalent radicals such as —C—O— or —SO2-. With each carboxyl group being bonded to a carbon atom of an either isolated or condensed aromatic ring.

Examples of aromatic dicarboxylic acids which can be used comprise phthalic acid, isophthalic acid and terephthalic acid, dibenzoic acid; dicarboxylic compounds containing two benzene rings, such as, e.g., 4,4'-diphenyl dicarboxylic acid, bis-(para-carboxyphenyl)-methane, paraoxy-(para-carboxyphenyl)-benzoic acid, ethylene-bis-(para-oxybenzoic acid), 1,5-naphthalene-dicarboxylic acid, 2,6-naphthalene-dicarboxylic acid, 2,7-naphthalene-dicarboxylic acid, phenanthrene-dicarboxylic acid, anthracene-dicarboxylic acid, 4,4-sulfonyl-dibenzoic acid and their (C1-C12)-alkyl derivatives and ring-substituted derivatives, such as, e.g., halogenated (e.g. F, Cl, Br) derivatives, (preferably C1-4-) alkoxy derivatives and aryl derivatives.

Aromatic acids containing a hydroxy group, such as, e.g., para-(beta-hydroxy-ethoxy)benzoic acid, can be used as well, provided that an (aromatic) dicarboxylic acid is also present.

Aromatic dicarboxylic acids constitute a preferred class of acids for the preparation of the copolyesters according to the present invention.

Among the aromatic acids, those which contain from 8 to 16 carbon atoms are preferred; particularly preferred are phenylene-dicarboxylic acids, i.e., phthalic acid, isophthalic acid and terephthalic acid. In particular, either terephthalic acid alone or a mixture of terephthalic acid and isophthalic acid are preferred.

Terephthalic acid must be at least part of the acids used.

The term "long chain ester units" also applies to units having formula (IIb) which are reaction products of a long chain dicarboxylic acid with a low molecular weight diols.

Long chain dicarboxylic acids (A) are dimerised fatty acids. The term dimer fatty acid is well known in the art and refers to the dimerisation product of mono- or polyunsaturated fatty acids. Preferred dimer acids are dimers of C10 to C30, more preferably C12 to O24, particularly C14 to C22, and especially C18 alkyl chains. Suitable dimer fatty acids include the dimerisation products of oleic acid, linoleic acid, linolenic acid, palmitoleic acid, elaidic acid, or erucic acid. The dimerisation products of the unsaturated fatty acid mixtures obtained in the hydrolysis of natural fats and oils, e.g. sunflower oil, soybean oil, olive oil, rapeseed oil, cottonseed oil and tall oil, may also be used.

Among these dimer acid products, the hydrogenated dimer acid products are preferred, and the purified and hydrogenated dimer fatty acids are particular preferred.

Long-chain glycols (G) suitable for preparing the polymers according to the present invention include poly-(alkylene oxide)-glycols [wherein "alkylene" preferably is a C2-10-alkylene] such as poly(ethylene oxide) glycol, poly-(1,2- and 1,3-propylene oxide)-glycol, poly-(tetramethylene oxide)-glycol, poly-(pentamethylene oxide)-glycol, poly(hexamethylene oxide)-glycol, poly-(heptamethylene oxide)-glycol, poly-(octamethylene oxide)glycol, poly-(nonamethylene oxide)-glycol, poly-(decamethylene oxide)-glycol and poly-(1,2-butylene oxide)-glycol; random copolymers or block copolymers of ethylene oxide and 1,2-propylene oxide; poly-formals prepared by reacting formaldehyde with glycols, such as pentamethylene-glycol, or glycol mixtures, such as mixtures of tetramethylene-glycol and pentamethylene-glycol; the dicarboxymethyl-acids of polyalkylene oxides, such as those derived from poly(tetramethylene oxide) or their esters. Furthermore, both polyisoprene-glycol and poly-butadiene-glycol, their copolymers and saturated products obtained by hydrogenation thereof may be used as long-chain polymeric glycols. Additionally, the glycol-esters of dicarboxylic acids formed by means of the oxidation of polyisobutylene-diene copolymers can be used as raw materials. Preferred long-chain glycols are poly(tetramethylene oxide) glycol having a number average molecular weight of 600-4000 and poly(ethylene oxide) glycol and/or poly-(1,2-and-1,3-propylene oxide)-glycol having a number average molecular weight of 1000-3000.

Poly-(tetramethylene oxide)-glycol is particularly preferred in the instant invention.

Long chain glycol comprises also dimerised fatty diol, deriving from hydrogenation of high purity dimer fatty acid, or a mixture of poly(alkylene oxide) glycol and dimer fatty diol.

Among dimer diol products the ones deriving from hydrogenation of high purity dimer fatty acid are preferred.

The ratio of soft to hard segments in the above described copolyester may vary within wide limits, but is preferably chosen such that a copolyether ester of relatively low hardness is obtained. Preferably, the hardness of the copolyether ester is below 50 Shore D, more preferably below 40 Shore D. In the preferred embodiment from 20 to 40 Shore D. A lower hardness of the copolyether ester generally results in improved low temperature performance and better soft feel, or soft touch, of the laminated product obtained by the process according to the invention.

The short-chain ester units having the formula (I) constitute about 10-95 weight percent of the copolyester, preferably from about 10-55 weight percent and more preferably about 13-40 weight percent, since this results in polymers having a desirable balance of elastomeric properties and toughness. The remainder of the copolyester consists of long-chain ester units [represented by either Formula (IIa) or (IIb) above] comprising about 5-90 weight percent and preferably 45-90 weight percent and more preferably 60-87 weight percent of the copolyester.

Preferred copolyester elastomers for use in the compositions of the foamed skin layer and the in mould decoration film layer of this invention are those prepared from dimethyl terephthalate, 1,4-butanediol and poly(tetramethylene oxide) glycol having a number average molecular weight of about 600-4000, more preferably about 1000-2000 and/or poly(ethylene oxide) glycol and/or poly-(1,2-and-1,3-propylene oxide)-glycol having molecular weights about 1000-3000.

Particularly preferred are Pibiflex® thermoplastic polyesters by P-Group, Ferrara, Italy.

Among Pibiflex copolyesters, more preferred for the composition of the present invention are those with Shore D below 40.

It is a further object of the invention to provide a completely recyclable, multilayered article consisting of:
i) a rigid layer formed of a thermoplastic polymer and
ii) a foamed skin layer formed of a thermoplastic polymer compatible with the material of the rigid layer,
both the thermoplastic polymer forming the rigid layer and the thermoplastic polymer forming the formed skin layer comprising polybutylene terephthalate, wherein the rigid layer comprises
 as component A1, from 45 to 100% by weight of polybutylene terephthalate
 as component A2, from 0 to 30% by weight of polyethylene terephthalate and
 as component B, from 0 to 25% by weight of an ASA copolymer.

In a still further alternative there is provided a completely recyclable, multilayered article consisting of;
i) a rigid layer formed of a thermoplastic polymer and
ii) a foamed skin layer formed of a thermoplastic polymer compatible with the material of the rigid layer,
both the thermoplastic polymer forming the rigid layer and the thermoplastic polymer forming the formed skin layer comprising polybutylene terephthalate, wherein the foamed skin layer forming thermoplastic polymer has a multiplicity of repeating long-chain ester units as soft segments and a multiplicity of repeating short-chain ester units as hard segments, said short-chain units being represented by the general formula (I):

—O-D-O—CO—R—CO (I) and said long-chain ester units being represented by the general formulas (IIa) and/or (IIb):

—O-G-O—CO—R—CO (IIa)

—O-D—CO-A-CO— (IIb)

wherein:
  D is a divalent radical remaining after the removal of the hydroxyl groups from an alkylene glycol having a molecular weight lower than about 250, 1,4-butanediol being at least a part of the alkene glycols used,
  R is a divalent radical remaining after the removal of the carboxyl groups from a dicarboxylic acid having a molecular weight lower than about 300, terephthalic acid being at least a part of the dicarboxylic acids used,
  G is a divalent radical remaining after the removal of the hydroxyl end groups from a long chain glycol having a molecular weight of from about 250 to about 6,000
a. A is a divalent radical remaining after the removal of the carbon groups from an unsaturated or saturated long chain dicarboxylic acid having from 1 to 25 carbon atoms and
b. O is oxygen.

Preferably the rigid layer comprises
  as component A1, from 45 to 100% by weight of polybutylene terephthalate,
  as component A2, from 0 to 30% by weight of polyethylene terephthalate and
  as component B, from 0 to 25% by weight of an ASA copolymer
and wherein the foamed skin layer forming thermoplastic polymer has a multiplicity of repeating long-chain ester units as soft segments and a multiplicity of repeating short-chain ester units as hard segments, said short-chain units being represented by the general formula (I):

—O-D-O—CO—R—CO (I) and said long-chain ester units being represented by the general formulas (IIa) and/or (IIb):

—O-G-O—CO—R—CO (IIa)

—O-D-O—CO-A-CO— (IIb)

wherein:
  D is a divalent radical remaining after the removal of the hydroxyl groups from an alkylene glycol having a molecular weight lower than about 250, 1,4-butane-diol being at least a part of the alkylene glycols used,
  R is a divalent radical remaining after the removal of the carboxyl groups from a dicarboxylic acid having a molecular weight lower than about 300, terephthalic acid being at least a part of the dicarboxylic acids used,
  G is a divalent radical remaining after the removal of the hydroxyl end groups from a long chain glycol having a molecular weight of from about 250 to about 6,000
  A is a divalent radical remaining after the removal of the carboxyl groups from an unsaturated or saturated long chain dicarboxylic acid having from 1 to 25 carbon atoms and
  O is oxygen.

APPLICATIONS AND EXAMPLES

The high heat resistance, good, heat-aging resistance, good mechanical properties and good surface properties of the novel moulding compositions make them suitable for a wide variety of mouldings in which these moulding compositions are present. Merely as examples, mention may be made of: camera cases, cases for mobile telephones, tube sections for binoculars, vapour ducts for vapour-extraction hoods, parts for pressure cookers, housings for hot-air grilles and pump housings.

The above mentioned properties make the novel mouldings particularly suitable for applications in motor vehicles.

Examples of novel mouldings produced in particular from the novel moulding compositions are parts such as light-switch housings, housings for the central electrical system, multipoint connectors, and plug connectors, housings for ABS controls, and identification plate supports, and also roof racks.

The good emission performance of the novel mouldings makes them particularly suitable for applications in motor vehicle interiors. The novel mouldings produced from the novel moulding compositions are therefore preferably protective coverings, storage compartment, dashboard supports, door breasts, parts for the centre console, and also retaining elements for radio and air-conditioning systems, covers for the centre console, covers for radio, air-conditioning systems and ash tray, prolongations for the centre console, storage pockets, storage areas for the drivers door and the passengers door, storage areas for the centre console, components for the driver's and passenger's seats, such as set coverings, defroster ducts, internal mirror housings, sun-roof elements, such as sun-roof frames, covers and protective surrounds for instruments, instrument sockets, upper and lower shells for the steering column, air ducts, air blowers and adapters for personal air-flow devices and defroster ducts, door side coverings, coverings in the knee area, air-outlet nozzles, defroster apertures, switches and levers, and also air-filter ducts and ventilation ducts, and in particular reinforcing parts of these. These applications are merely examples of possible applications in motor vehicle interiors. The novel mouldings are particularly preferably laser-mark able.

Preference is also given to mouldings for exterior bodywork parts, in particular fenders, tailgates, side panelling, bumpers, panelling, identification plate supports, panels, sunroofs, sunroof frames, and also impact protectors and constituents of these.

Other applications which may be mentioned as other mouldings not restricted to the motor vehicle sector are boat hulls, lawnmower housings, garden furniture, motorcycle parts, camera cases, cases for mobile telephones, tube sections for binoculars, vapour ducts for vapour-extraction hoods, parts for pressure cookers, housings for hot-air grilles and pump housings.

The moulding composition has proven especially useful in mouldings such as plug connectors and housing parts, and in particular for large vehicle electronics, in particular electronics for ABS/ASC, for transmission systems for ESP, for seats, for mirror motors, for window-lifter motors, for retractable roofs, for airbag triggering, for passenger compartment safety, for acceleration sensors, and for ignition electronics, and also in electrics for detecting seat occupation. Other preferred uses of the novel moulding composition are for locking-systems housings, auto relays and covers for wiper housings, and also for lock housings. Another preferred group of mouldings which can be produced from the novel moulding compositions is that of gas meter housings, wind deflectors, actuating-motor housings, where the actuating motors are preferably used in automotive construction, parts for power drills, parts for ovens, in particular to insulate from heat, for example knobs and oven handles, screen wiper parts, in particular wiper-blade retainers, spoilers, mirror support plates for motor vehicle mirrors, and also housings for washing machine control systems.

The novel moulding compositions are also suitable for other mouldings used in the household sector, preferable in the kitchen sector. These include bread-baking machines, toasters, table grills, kitchen machinery, electric tin-openers and juice presses. In these products it is preferably the switches, housings, handles and covers which are produced form the novel moulding compositions. The novel moulding compositions may also be used for mouldings in stoves, preferably stove handles, stove knobs and switches.

The use of the novel moulding compositions has also proven successful in producing large-surface-area mouldings which are comparatively thin in relation to their surface area and for which excellent de moulding performance is demanded. Particular large-surface-area mouldings of this type are sunroof rails, exterior bodywork parts, air inlet grilles, dashboard parts, such as dashboard supports, protective covers, air ducts, add-on parts, in particular for the centre console as a part of the glove compartment, and also protective surrounds for tachometers.

Particularly preferred is the use of an over moulded structure according to the invention for motor vehicle interiors.

The examples below describe the invention in greater detail:

Example 1

Over Injection Technique

Foamed Skin Layer
Material: Pibiflex® 2567S of P-Group, Italy (chemical composition; TCP-ET (ISO 1043))
Processing Parameters of Straight Injection Moulding for the Foamed Skin Layer:

| Melt temperature | app. 230° C. |
| Mould temperature | app. 70° C. |
| Injection speed | 80 mm/min |
| Clamp force | 200 KN |
| Backpressure | none |

Rigid Layer
Material: Ultradur® S 4090 GX of BASF AG (68 weight-% PBT, 17 weight-% ASA, 15 weight-% glass fiber)
Processing Parameters for the Rigid Layer

| Melt temperature | app. 270° C. |
| Mould temperature | app. 70° C. |
| Injection speed | 30 mm/min |
| Clamp force | 2500 kN |
| Backpressure | 20 bar |

The Ultradur® was injected into a disc mould with a diameter of about 300 mm and a gap between the two sides of 2 mm. The mould was opened by another 2 mm and Pibiflex® was injected. Immediately after filling the mould was opened another 3 mm. This allowed the solved gas to build the foam. The final thickness of the foamed layer was 5 mm.

The Pibiflex® layer was formed using Pibiflex® with solved $N_2$ of 0.6 vol.-% referred to the complete Pibiflex® volume. The $N_2$ was introduced into the Pibiflex® material at a pressure of about 300 bar into the barrel of an extruder, the temperature of the barrel being between 220° C. and 260° C.

Example 2

The same processing parameters and polymeric materials as example 1, but a physical and chemical foaming agent were used together.

The same process conditions as reported in example 1 were maintained with reference to the physical foaming, but Pibiflex® material was previously dry blended with 1.5 weight percentage of the sodium carbonate based additives Hydrocerol® CF40E of P-Group, Italy, as chemical foaming agent.

The so prepared over moulded structure had good soft feeling properties. The adhesion in between the layers was excellent.

The adhesion forces between the rigid layer and the soft layer of the articles obtained according to examples 1 and 2 reached a value of minimum 20 N/cm, while the adhesion forces between the layers of a conventional article formed of SMA (styrene-maleic anhydride)/polyurethane-foam only reach a value of about 10 N/cm.

In contrast to the polymer combinations of the state of the art the article could easily be recycled without the need of separating the different polymers before as the described system includes only one material class.

The major advantages are the mechanical properties of a shreddered and reinjected moulded part with soft touch which are in the region of about 80% of the original elongation at break of the rigid layer.

The invention claimed is:
1. An injection moulding process for making a completely recyclable, multilayered article consisting of:
   i) a rigid layer formed of a thermoplastic polymer which comprises
      as component A1, from 45 to 90% by weight of polybutylene terephthalate,
      as component A2, from 0 to 30% by weight of polyethylene terephthalate and
      as component B, from 10 to 25% by weight of an Acrylonitrile Styrene Acrylate (ASA) copolymer and
   ii) a foamed skin layer formed of a thermoplastic polymer compatible with the material of the rigid layer, wherein in the process consists essentially of
      injection moulding of the rigid layer into a mould composed of two sides,
      lifting one side of the mould, or change one side of the mould to obtain a small gap of between 3 to 4 mm between the rigid layer and the side of the mould lifted or changed and
      injecting the foamed skin layer into the gap formed in step b),
   wherein the foamed skin layer forming thermoplastic polymer comprising polybutylene terephthalate, wherein the foamed skin layer forming thermoplastic polymer has a multiplicity of repeating long-chain ester units as soft segments and a multiplicity of repeating short-chain ester units as hard segments, said short-chain units being represented by the general formula (I):

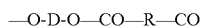

(I) and said long-chain ester units being represented by the general formulas (IIa) and/or (IIb):

—O-G-O—CO—R—CO (IIa)

—O-D-O—CO-A-CO— (IIb)

wherein:
D is a divalent radical remaining after the removal of the hydroxyl groups from an alkylene glycol having a molecular weight lower than about 250, 1,4-butanediol being at least a part of the alkylene glycols used,
R is a divalent radical remaining after the removal of the carboxyl groups from dicarboxylic acid having a molecular weight lower than about 300, terephthalic acid being at least a part of the dicarboxylic acids used,
G is a divalent radical remaining after the removal of the hydroxyl end groups from a long chain glycol having a molecular weight of from about 250 to about 6,000
g. A is a divalent radical remaining after the removal of the carboxyl groups from an unsaturated or saturated long chain dicarboxylic acid having from 1 to 25 carbon atoms and
h. O is oxygen
wherein component B comprises
from 50 to 90% by weight of a particulate graft base B1 made from the following monomers
as component B11, from 75 to 99.9% by weight of a C1-C10-alkyl acrylate,
as component B12, from 0.1 to 10% by weight of at least one polyfunctional monomer having at least two non-conjugated olefinic double bonds, and
as component B13, from 0 to 24.9% by weight of one or more other copolymerizable monomers, and
from 10 to 50% by weight of a graft B2 grafted onto graft base B1 and made from the following monomers
as component B21, from 50 to 29% by weight of a vinylaromatic monomer, and
as component B22, from 10 to 50% by weight of acrylonitrile and/or methacrylonitrile.

2. The injection moulding process according to claim 1, wherein
i) the rigid layer is formed of a fiber reinforced polybutylene terephthalate (PBT)/Acrylonitrile Styrene Acrylate (ASA) blend.

3. The injection moulding process of claim 1, wherein the foamed skin layer is formed by overmoulding.

4. The injection moulding process according to claim 1, wherein the foamed skin layer is obtained by co-injection of a first thermoplastic material in the presence of a foaming agent, forming a foamed layer part and of a second thermoplastic material without the presence of a foaming agent, forming a skin layer part.

5. The process of claim 1, wherein the skin of the foamed skin layer is formed by an in mould decoration film layer, which is compatible to the thermoplastic polymer of the rigid layer and of the foamed layer, and which is inserted into the mould after the rigid layer had been injected, the foamed layer being injected after insertion of the in mould decoration film layer.

6. The process of claim 1, wherein the rigid layer comprises
as component A1, from 80 to 90% by weight of polybutylene terephthalate and
as component B, from 10 to 15% by weight of an Acrylonitrile Styrene Acrylate (ASA) copolymer.

7. The process of claim 1, wherein the rigid layer is reinforced by 5-30% glass, carbon or thermoplastic fibers.

8. The process of claim 1, wherein the foamed skin layer has a layer thickness of 1 to 12 mm.

9. An injection moulding process for making a completely recyclable, multilayered article consisting of:
ii) a rigid layer formed of a thermoplastic polymer which comprises
as component A11, from 45 to 90% by weight of polybutylene terephthalate,
as component A2, from 0 to 30% by weight of polyethylene terephthalate and
as component B, from 10 to 25% by weight of an Acrylonitrile Styrene Acrylate (ASA) copolymer and
ii) a foamed skin layer formed of a thermoplastic polymer compatible with the material of the rigid layer, wherein in the process consists essentially of
injection moulding of the rigid layer into a mould composed of two sides,
lifting one side of the mould, or change one side of the mould to obtain a small gap of between 3 to 4 mm between the rigid layer and the side of the mould lifted or changed and
injecting the foamed skin layer into the gap formed in step b),
wherein the foamed skin layer forming thermoplastic polymer comprising polybutylene terephthalate, wherein the foamed skin layer forming thermoplastic polymer has a multiplicity of repeating long-chain ester units as soft segments and a multiplicity of repeating short-chain ester units as hard segments, said short-chain units being represented by the general formula (I):

—O-D-O—CO—R—CO (I) and said long-chain ester units being represented by the general formulas (IIa) and/or (IIb):

—O-G-O—CO—R—CO (IIa)

—O-D-O—CO-A-CO— (IIb)

wherein:
D is a divalent radical remaining after the removal of the hydroxyl groups from an alkylene glycol having a molecular weight lower than about 250, 1,4-butanediol being at least a part of the alkylene glycols used,
R is a divalent radical remaining after the removal of the carboxyl groups from dicarboxylic acid having a molecular weight lower than about 300, terephthalic acid being at least a part of the dicarboxylic acids used,
G is a divalent radical remaining after the removal of the hydroxyl end groups from a long chain glycol having a molecular weight of from about 250 to about 6,000
g. A is a divalent radical remaining after the removal of the carboxyl groups from an unsaturated or saturated long chain dicarboxylic acid having from 1 to 25 carbon atoms and
h. O is oxygen, and
wherein component B comprises
from 50 to 90% by weight of a particulate graft base B1 made from the following monomers
as component B11, from 75 to 99.9% by weight of a C1-C10-alkyl acrylate,
as component B12, from 0.1 to 10% by weight of at least one polyfunctional monomer having at least two non-conjugated olefinic double bonds, and
as component B13, from 0 to 24.9% by weight of one or more other copolymerizable monomers, and from 10 to 50% by weight of a graft B2 grafted onto graft base B1 and made from the following monomers as component B21, from 50 to 29% by weight of a vinylaromatic monomer, and as component B22, from 10 to 50% by weight of acrylonitrile and/or methacrylonitrile.

10. The process as claimed in claim 9, wherein the rigid layer is reinforced by 5-30% glass, carbon or thermoplastic fibers.

11. The process of claim 10, wherein the foamed skin layer has a layer thickness of 1 to 12 mm.

* * * * *